United States Patent
Mieno et al.

(10) Patent No.: US 12,521,326 B2
(45) Date of Patent: Jan. 13, 2026

(54) AEROSOL COMPOSITION

(71) Applicant: KAO CORPORATION, Tokyo (JP)

(72) Inventors: Akiko Mieno, Sumida-ku (JP); Sho Idomoto, Sumida-ku (JP)

(73) Assignee: KAO CORPORATION, Tokyo (JP)

(*) Notice: Subject to any disclaimer, the term of this patent is extended or adjusted under 35 U.S.C. 154(b) by 512 days.

(21) Appl. No.: 18/000,090

(22) PCT Filed: Apr. 5, 2021

(86) PCT No.: PCT/JP2021/014431
§ 371 (c)(1),
(2) Date: Nov. 28, 2022

(87) PCT Pub. No.: WO2021/241006
PCT Pub. Date: Dec. 2, 2021

(65) Prior Publication Data
US 2023/0190591 A1   Jun. 22, 2023

(30) Foreign Application Priority Data

May 29, 2020  (JP) .................. 2020-094440

(51) Int. Cl.
| | | |
|---|---|---|
| *A61K 8/19* | (2006.01) | |
| *A61K 8/04* | (2006.01) | |
| *A61K 8/34* | (2006.01) | |
| *A61K 8/41* | (2006.01) | |
| *A61K 8/42* | (2006.01) | |
| *A61K 8/60* | (2006.01) | |
| *A61K 8/86* | (2006.01) | |
| *A61Q 5/00* | (2006.01) | |
| *A61Q 5/12* | (2006.01) | |

(52) U.S. Cl.
CPC .............. *A61K 8/046* (2013.01); *A61K 8/19* (2013.01); *A61K 8/342* (2013.01); *A61K 8/41* (2013.01); *A61K 8/602* (2013.01); *A61K 8/86* (2013.01); *A61Q 5/12* (2013.01); *A61K 2800/222* (2013.01)

(58) Field of Classification Search
None
See application file for complete search history.

(56) References Cited

U.S. PATENT DOCUMENTS

| | | | |
|---|---|---|---|
| 2008/0131378 A1* | 6/2008 | Keller ............... | A61K 8/046 424/47 |
| 2012/0288465 A1 | 11/2012 | Loechel | |
| 2017/0000711 A1 | 1/2017 | Jansen et al. | |
| 2018/0036219 A1 | 2/2018 | Song et al. | |
| 2023/0201100 A1 | 6/2023 | Yuki | |
| 2023/0210734 A1 | 7/2023 | Yuki et al. | |

FOREIGN PATENT DOCUMENTS

| | | | |
|---|---|---|---|
| CN | 107530262 | A | 1/2018 |
| EP | 2 191 811 | A1 | 6/2010 |
| JP | 8-253409 | A | 10/1996 |
| JP | 2009-501781 | A | 1/2009 |
| JP | 2014-513695 | A | 6/2014 |
| JP | 2016-88843 | A | 5/2016 |
| JP | 2019-526586 | A | 9/2019 |
| JP | 2021-187777 | A | 12/2021 |
| JP | 2021-187834 | A | 12/2021 |
| JP | 2021-187835 | A | 12/2021 |
| WO | WO-2007/010487 | A2 | 1/2007 |
| WO | WO-2007/010487 | A3 | 1/2007 |
| WO | WO-2012/154918 | A2 | 11/2012 |
| WO | WO-2012/154918 | A3 | 11/2012 |

OTHER PUBLICATIONS

International Search Report issued May 25, 2021 in PCT/JP2021/014431, filed on Apr. 5, 2021, 2 pages.
Extended European Search Report issued Apr. 3, 2025 in European Patent Application No. 21812924.5, 10 pages.

* cited by examiner

*Primary Examiner* — Brian Gulledge
(74) *Attorney, Agent, or Firm* — Oblon, McClelland, Maier & Neustadt, L.L.P.

(57) ABSTRACT

An aerosol composition including an aerosol stock solution containing a cationic surfactant (A) and a linear saturated higher alcohol (B), and a propellant (C) containing carbon dioxide. The component (A) containing a mono-long-chain-alkyl cationic surfactant (A1). A content of the component (A) being 0.9% by mass or more and less than 6.0% by mass in the aerosol stock solution. A molar ratio [(B)/(A1)] of the component (B) with respect to the component (A1) being 3.0 or more and 7.0 or less in the aerosol stock solution. A content of the component (A1) in the component (A) being 90% by mass or more and 100% by mass or less, and a difference between a number of carbon atoms of the long-chain alkyl in the component (A1) and the number of carbon atoms of the component (B) being 0.

16 Claims, No Drawings

AEROSOL COMPOSITION

CROSS REFERENCE TO RELATED APPLICATIONS

This application is a National Stage entry under 35 U.S.C. § 371 of PCT/JP2021/014431, filed on Apr. 5, 2021, and claims priority to Japanese Patent Application No. 2020-094440, filed on May 29, 2020. The entire contents of both are incorporated herein by reference.

FIELD OF THE INVENTION

The present invention relates to an aerosol composition.

BACKGROUND OF THE INVENTION

Aerosol type cosmetics have an advantage that the cosmetics as an aerosol stock solution can be easily coated and spread on the skin or the hair since the cosmetics can be used by discharging in the form of foam.

The aerosol stock solution contains a care ingredient mixed therein corresponding to the target capability and purpose. For example, in the case where the aerosol type cosmetics are hair cosmetics, such as a hair rinse, a hair treatment agent and a hair conditioning agent, it has been known that a cationic surfactant is added for the purpose of imparting conditioning effect, and a higher alcohol is added for the purpose of imparting the smooth use feeling and the good finish. A cationic surfactant and a higher alcohol mixed therein in high concentrations can further enhance the smooth use feeling and the good finish.

Aerosol type cosmetics using carbon dioxide gas as a propellant have been known. The use of carbon dioxide gas as the propellant of the aerosol type cosmetics can discharge creamy and elastic foam providing the good use feeling. Furthermore, the foam is retained for a long period of time without immediate loss thereof. Moreover, by entraining carbon dioxide gas in the discharged foam, the carbon dioxide gas is expected to have an effect of functioning as a cosmetic care ingredient, such as an aging care ingredient, in application to the skin or the hair.

As aerosol type cosmetics using carbon dioxide gas as a propellant, for example, Patent Literature 1 (JP 8-253409 A) describes that an aerosol composition containing an aqueous stock solution containing water and a surfactant, and a propellant containing a compressed gas, such as a liquified gas or carbon dioxide gas, having a weight ratio of the aqueous stock solution and the liquified gas, a content of the surfactant, and a content of dimethyl ether as the liquified gas that are in the prescribed ranges can provide a discharged matter having gloss, soft cream-like fineness, and considerably good foam dissipation.

Patent Literature 2 (JP 2009-501781 A) describes that an aerosol composition for hair conditioning containing the prescribed amounts of a cationic surfactant, an aliphatic alcohol, carbon dioxide, and an additional propellant can achieve considerably concentrated creamy aerosol mousse having gloss.

Patent Literature 3 (JP 2014-513695 A) describes a cosmetic composition in a container having the prescribed shape having at least one inner bag and an outer container, and the composition is a cosmetic composition for hair conditioning or the like containing the prescribed amounts of a cationic surfactant, a fatty alcohol, and carbon dioxide, capable of forming stable mousse.

Patent Literature 4 (JP 2016-88843 A) describes that an aerosol type hair treatment composition, such as a hair care agent, that contains a stock solution containing at least one kind selected from a branched alcohol having the prescribed structure or ethanol, a linear saturated higher alcohol, and an amidoamine, and is used in the state where a propellant is mixed therein, can be smoothly discharged from the container along with the propellant while making good feeling of the hair.

SUMMARY OF THE INVENTION

The present invention relates to an aerosol composition containing
an aerosol stock solution containing a cationic surfactant (A) and a linear saturated higher alcohol (B), and
a propellant (C) containing carbon dioxide,
the component (A) containing a mono-long-chain-alkyl type cationic surfactant (A1), a content of the component (A) being 0.9% by mass or more and less than 6.0% by mass, a molar ratio [(B)/(A1)] of the component (B) with respect to the component (A1) being 3.0 or more and 7.0 or less.

DETAILED DESCRIPTION OF THE INVENTION

[Aerosol Composition]

The aerosol composition of the present invention (which may be hereinafter referred simply to as a "composition of the present invention") is an aerosol composition containing
an aerosol stock solution containing a cationic surfactant (A) and a linear saturated higher alcohol (B), and
a propellant (C) containing carbon dioxide,
the component (A) contains a mono-long-chain-alkyl type cationic surfactant (A1), the content of the component (A) is 0.9% by mass or more and less than 6.0% by mass, and the molar ratio [(B)/(A1)] of the component (B) with respect to the component (A1) is 3.0 or more and 7.0 or less.

Even in the case where an aerosol stock solution containing a cationic surfactant and a higher alcohol in high concentrations and a propellant containing carbon dioxide are used in combination, the composition of the present invention is excellent in storage stability without separation occurring with the passage of time.

In the present invention, the expression "to have a component X" and "to contain a component X" also mean "to be formed by mixing a component X".

An aerosol composition containing an aerosol stock solution containing a cationic surfactant and a higher alcohol in high concentrations, and a propellant containing carbon dioxide may cause separation with the passage of time in some cases, and has been necessarily improved in storage stability. An aerosol composition containing, for example, a liquified petroleum gas (LPG) as a propellant has not had the aforementioned problem found therein since the aerosol composition is uniformly mixed immediately before use by shaking the aerosol container.

An object of the present invention is to provide an aerosol composition that contains an aerosol stock solution containing a cationic surfactant and a higher alcohol in high concentrations, and a propellant containing carbon dioxide, and may not be necessarily shaken immediately before use due to the excellent storage stability thereof.

The present inventors have found that the problem can be solved by an aerosol composition containing an aerosol stock solution containing a prescribed cationic surfactant and a linear saturated higher alcohol in a prescribed ratio, and a propellant containing carbon dioxide.

According to the present invention, an aerosol composition that contains an aerosol stock solution containing a cationic surfactant and a higher alcohol in high concentrations, and a propellant containing carbon dioxide, is excellent in storage stability, and may not be necessarily shaken immediately before use.

The mechanism that the aerosol composition of the present invention exhibits the effects of the present invention due to the aforementioned configuration is not clear, but can be estimated as follows.

The aerosol stock solution used in the aerosol composition of the present invention contains a cationic surfactant (A) (which may be hereinafter referred simply to as a "component (A)") and a linear saturated higher alcohol (B) (which may be hereinafter referred simply to as a "component (B)").

The cationic surfactant (A) is used for imparting the dischargeability of foam through aerosol effect and the target capability corresponding to the purpose of the aerosol composition. For example, in the case where the aerosol composition is a hair cosmetic composition, the conditioning effect of hair, the smooth use feeling, and the good finish can be imparted.

In the present invention, the cationic surfactant (A) contains a mono-long-chain-alkyl type cationic surfactant (A1) (which may be hereinafter referred simply to as a "component (A1)"). For enhancing the dischargeability of foam in aerosol, the aerosol stock solution preferably has low viscosity, and the use of the component (A1) as the cationic surfactant can enhance the conditioning effect of hair, can impart the smooth use feeling and the good finish, and also can lower the viscosity of the aerosol stock solution.

The higher alcohol mixed in the hair cosmetic composition can also impart the smooth use feeling and the good finish.

Carbon dioxide used in the propellant (C) has higher foamability than liquified petroleum gas (LPG), and has higher solubility in water than other propellants, such as nitrogen. Accordingly, the use of carbon dioxide as the propellant enables discharge of fine dense foam containing carbon dioxide gas.

However, it has been found that in the case where an aerosol stock solution that contains large amounts of a cationic surfactant and a higher alcohol and has a lowered viscosity is charged and stored with a propellant containing carbon dioxide, separation thereof occurs with the passage of time. The phenomenon is considered to occur in such a manner that the dissolved state of carbon dioxide in the aerosol stock solution is changed with the passage of time, and thereby the cationic surfactant and the higher alcohol are separated and deposited.

As described above, for example, an aerosol composition containing LPG as a propellant is discharged as foam after uniformly mixing by shaking the aerosol container immediately before use, and therefore the aforementioned problem has not been found therein.

As a result of the investigation by the present inventors, it has been found that the storage stability can be improved by using the prescribed amount of a mono-long-chain-alkyl type cationic surfactant (A1) as a cationic surfactant (A), and furthermore using a linear saturated higher alcohol (B) as a higher alcohol in the prescribed proportion with respect to the component (A1). It is considered that this is because the linear saturated higher alcohol (B) has a higher effect of stably dispersing in the aerosol composition in the combination use with the component (A1), than a branched saturated higher alcohol.

Furthermore, it is considered that in the case where the content of the cationic surfactant (A) in the aerosol composition is in the prescribed range, and the molar ratio of the component (B) with respect to the component (A1) is 3.0 or more and 7.0 or less, the dispersion stability of the component (A1) and the component (B) in the aerosol composition can be enhanced, and thereby the storage stability can be enhanced by suppressing separation of the composition.

The application of the aerosol composition of the present invention is not particularly limited, and is preferably a hair cosmetic composition from the standpoint of the effect provided by the cationic surfactant and the linear saturated higher alcohol. Examples of the hair cosmetic composition include a hair cleanser, such as a shampoo, a hair rinse, a hair conditioning agent, a hair treatment agent (including a non-rinse type), a hair styling agent, a hair dye, and a hair growth agent. Among these, the aerosol composition is preferably a hair rinse, a hair conditioning agent, a hair treatment agent, or a hair styling agent, and more preferably a hair rinse, a hair conditioning agent or a hair treatment agent, from the standpoint of the cationic surfactant contained.

<Component (A): Cationic Surfactant>

The aerosol stock solution constituting the aerosol composition of the present invention contains a cationic surfactant as a component (A). The component (A) is used for imparting the dischargeability of foam through aerosol effect and the target capability corresponding to the purpose of the aerosol composition.

The component (A) contains a mono-long-chain-alkyl type cationic surfactant (A1) from the standpoint of the reduction in viscosity of the aerosol stock solution.

(Mono-Long-Chain-Alkyl Type Cationic Surfactant (A1))

Examples of the component (A1) include an alkyltrimethylammonium salt (A1-1), an alkoxyalkyltrimethylammonium salt (A1-2), an alkylamidoalkyltrimethylammonium salt (A1-3), an alkyldimethylamine and a salt thereof (A1-4), an alkoxyalkyldimethylamine and a salt thereof (A1-5), and an alkylamidoalkyldimethylamine and a salt thereof (A1-6), and one kind or two or more kinds thereof may be used.

Preferred examples of the alkyltrimethylammonium salt (A1-1) an alkyltrimethylammonium salt having a long-chain alkyl group having 8 or more and 22 or less carbon atoms, more preferably 8 or more and 18 or less carbon atoms, and further preferably 12 or more and 18 or less carbon atoms, and specific examples thereof include cetyltrimethylammonium chloride (cetrimonium chloride), stearyltrimethylammonium chloride (steartrimonium chloride), and behenyltrimethylammonium chloride.

Preferred examples of the alkoxyalkyltrimethylammonium salt (A1-2) include an alkoxyalkyltrimethylammonium salt having a long-chain alkoxy group having 8 or more and 22 or less carbon atoms, more preferably 8 or more and 18 or less carbon atoms, and further preferably 12 or more and 18 or less carbon atoms, and specific examples thereof include stearoxypropyltrimethylammonium chloride, stearoxyethyltrimethylammonium chloride, and stearoxyhydroxypropyltrimethylammonium chloride.

Preferred examples of the alkylamidoalkyltrimethylammonium salt (A1-3) include an alkylamidoalkyltrimethylammonium salt having a long-chain alkyl group having 8 or more and 22 or less carbon atoms, more preferably 8 or more and 18 or less carbon atoms, and further preferably 12 or more and 18 or less carbon atoms, and specific examples thereof include palmitamidopropyltrimethylammonium chloride (palmitamidopropyltrimonium chloride).

The alkyldimethylamine, the alkoxyalkyldimethylamine, and the alkylamidoalkyldimethylamine each react with an acid to form a tertiary amine salt, which functions as a cationic surfactant.

The alkyl group in the alkyldimethylamine and a salt thereof (A1-4) and the alkoxyalkyldimethylamine and a salt thereof (A1-5) is preferably a long-chain alkyl group having 8 or more and 22 or less carbon atoms, more preferably 8 or more and 18 or less carbon atoms, and further preferably 12 or more and 18 or less carbon atoms.

The alkyl group in the alkylamidoalkyldimethylamine and a salt thereof (A1-6) is preferably a long-chain alkyl group having 7 or more and 21 or less carbon atoms, more preferably 7 or more and 17 or less carbon atoms, and further preferably 11 or more and 17 or less carbon atoms.

The amines, i.e., the alkyldimethylamine, the alkoxyalkyldimethylamine, and the alkylamidoalkyldimethylamine, each may be mixed in the aerosol stock solution after reacting with an acid to form a salt thereof in advance, or may be mixed directly in the aerosol stock solution as an amine, followed by forming a salt thereof in the aerosol stock solution by mixing an acid in the aerosol stock solution. Accordingly, the amine and a salt thereof herein each are defined as a cationic surfactant. The content thereof is converted to the mass or the molar amount of the amine.

Examples of the salt of the amine include salts with an organic acid or an inorganic acid. Examples of the organic acid include a monocarboxylic acid, such as acetic acid and a propionic acid; a dicarboxylic acid, such as malonic acid, succinic acid, glutaric acid, adipic acid, maleic acid, fumaric acid, and phthalic acid; a polycarboxylic acid, such as polyglutamic acid; a hydroxycarboxylic acid, such as glycolic acid, lactic acid, hydroxyacrylic acid, glyceric acid, malic acid, tartaric acid, and citric acid; and an acidic amino acid, such as glutamic acid and aspartic acid. Examples of the inorganic acid include hydrochloric acid, sulfuric acid, and phosphoric acid. Among these, an organic acid is preferred, and one or more kinds selected from the group consisting of a dicarboxylic acid, a hydroxycarboxylic acid, and an acidic amino acid is more preferred. The dicarboxylic acid is more preferably one or more kinds selected from the group consisting of maleic acid and succinic acid. The hydroxycarboxylic acid is more preferably one or more kinds selected from the group consisting of glycolic acid, lactic acid, and malic acid. The acidic amino acid is more preferably glutamic acid.

Examples of the alkyldimethylamine and a salt thereof (A1-4) include N,N-dimethylbehenylamine, N,N-dimethylstearylamine, and organic acid salts thereof, and N,N-dimethylbehenylamine, and N,N-dimethylstearylamine, and lactate salts or glycolate salts are preferred.

Examples of the alkoxyalkyldimethylamine and a salt thereof (A1-5) include N,N-dimethyl-3-hexadecyloxypropylamine, N,N-dimethyl-3-octadecyloxypropylamine, and organic acid salts thereof, and N,N-dimethyl-3-hexadecyloxypropylamine, N,N-dimethyl-3-octadecyloxypropylamine (stearoxypropyldimethylamine), and lactate salts or glycolate salts are preferred.

Examples of the alkylamidoalkyldimethylamine and a salt thereof (A1-6) include N-[3-(dimethylamino)propyl]docosamide (docosanoic acid dimethylaminopropylamide), N-[3-(dimethylamino)propyl]stearamide (stearic acid dimethylaminopropylamide), and organic acid salts thereof, and N-[3-(dimethylamino)propyl]docosamide, N-[3-(dimethylamino)propyl]stearamide, and lactate salts or glycolate salts are preferred.

One kind or two or more kinds of the component (A1) may be used.

Among the above, the component (A1) is preferably one or more kind selected from the group consisting of the alkyldimethylamine and a salt thereof (A1-4), the alkoxyalkyldimethylamine and a salt thereof (A1-5), and the alkylamidoalkyldimethylamine and a salt thereof (A1-6), more preferably one or more kind selected from the group consisting of the alkoxyalkyldimethylamine and a salt thereof (A1-5) and the alkylamidoalkyldimethylamine and a salt thereof (A1-6), and further preferably one or more kind selected from the group consisting of N,N-dimethyl-3-octadecyloxypropylamine and stearic acid dimethylaminopropylamide, from the standpoint of the enhancement of the storage stability and the dischargeability of foam through aerosol effect, the standpoint of imparting the conditioning effect of hair and imparting the smooth use feeling and the good finish in the case where the aerosol composition is a hair cosmetic composition, and the standpoint of the corrosion suppression of the aerosol container.

The content of the component (A1) in the aerosol stock solution is 0.9% by mass or more, preferably 1.0% by mass or more, more preferably 1.2% by mass or more, and further preferably 1.3% by mass or more, from the standpoint of the enhancement of the storage stability and the dischargeability of foam through aerosol effect, and the standpoint of imparting the conditioning effect of hair and imparting the smooth use feeling and the good finish in the case where the aerosol composition is a hair cosmetic composition. The content thereof is less than 6.0% by mass, preferably 5.0% by mass or less, more preferably 4.0% by mass or less, further preferably 3.5% by mass or less, still further preferably 3.0% by mass or less, and still more further preferably 2.5% by mass or less, from the standpoint of the enhancement of the storage stability and the dischargeability of foam through aerosol effect. The specific range of the content of the component (A1) in the aerosol stock solution is 0.9% by mass or more and less than 6.0% by mass, preferably 0.9 to 5.0% by mass, more preferably 0.9 to 5.0% by mass, further preferably 0.9 to 4.0% by mass, still further preferably 0.9 to 3.5% by mass, still more further preferably 0.9 to 3.0% by mass, still more further preferably 0.9 to 2.5% by mass, still more further preferably 1.0 to 2.5% by mass, still more further preferably 1.2 to 2.5% by mass, and still more further preferably 1.3 to 2.5% by mass.

The content of the component (A1) in the component (A) is preferably 50% by mass or more, more preferably 60% by mass or more, further preferably 70% by mass or more, still further preferably 80% by mass or more, and still more further preferably 90% by mass or more, and is 100% by mass or less, from the standpoint of the enhancement of the storage stability and the dischargeability of foam through aerosol effect, and the standpoint of imparting the conditioning effect of hair and imparting the smooth use feeling and the good finish in the case where the aerosol composition is a hair cosmetic composition.

The component (A) may contain a cationic surfactant other than the component (A1). Examples of the cationic surfactant other than the component (A1) include a di-long-chain-alkyl type cationic surfactant (A2) (which may be hereinafter referred simply to as a "component (A2)"). The use of the component (A2) can enhance the miscibility of the aerosol stock solution and carbon dioxide in the propellant (C).

(Di-Long-Chain-Alkyl Type Cationic Surfactant (A2))

Examples of the di-long-chain-alkyl type cationic surfactant include a dialkyldimethylammonium salt, and preferred examples thereof include a dialkyldimethylammonium salt having a long-chain alkyl group having 8 or more and 22 or less carbon atoms, more preferably 8 or more and 18 or less carbon atoms, and further preferably 12 or more and 18 or less carbon atoms. Specific examples thereof include distearyldimethylammonium chloride and a dialkyl(C12-18)dimethylammonium chloride, and one kind or two or more kinds thereof may be used.

In the case where the component (A2) is used, the content of the component (A2) in the aerosol stock solution is preferably 0.001% by mass or more, more preferably 0.005% by mass or more, and further preferably 0.02% by mass or more, from the standpoint of the enhancement of the miscibility of the aerosol stock solution and carbon dioxide in the propellant (C). The content thereof is preferably 2.0% by mass or less, more preferably 1.5% by mass or less, further preferably 1.0% by mass or less, still further preferably 0.5% by mass or less, and still more further preferably 0.2% by mass or less, from the standpoint of the enhancement of the storage stability. The specific range of the content of the component (A2) in the aerosol stock solution is preferably 0.001 to 2.0% by mass, more preferably 0.001 to 1.5% by mass, further preferably 0.001 to 1.0% by mass, still further preferably 0.005 to 1.0% by mass, still more further preferably 0.01 to 1.0% by mass, still more further preferably 0.01 to 0.5% by mass, and still more further preferably 0.01 to 0.2% by mass.

The content of the component (A) in the aerosol stock solution is 0.9% by mass or more, preferably 1.0% by mass or more, more preferably 1.2% by mass or more, and further preferably 1.3% by mass or more, from the standpoint of imparting the conditioning effect of hair and imparting the smooth use feeling and the good finish in the case where the aerosol composition is a hair cosmetic composition. The content thereof is less than 6.0% by mass, preferably 5.0% by mass or less, more preferably 4.0% by mass or less, and further preferably 3.5% by mass or less, from the standpoint of the storage stability and the miscibility with carbon dioxide in the propellant (C). The specific range of the content of the component (A) in the aerosol stock solution is 0.9% by mass or more and less than 6.0% by mass, preferably 0.9 to 5.0% by mass, more preferably 0.9 to 4.0% by mass, further preferably 0.9 to 3.5% by mass, still further preferably 1.0 to 3.5% by mass, still more further preferably 1.2 to 3.5% by mass, and still more further preferably 1.3 to 3.5% by mass.

<Component (B): Linear Saturated Higher Alcohol>

The aerosol stock solution constituting the aerosol composition of the present invention contains a linear saturated higher alcohol as a component (B). The component (B) is used for imparting the target capability to the aerosol composition. For example, in the case where the aerosol composition is a hair cosmetic composition, the smooth use feeling and the good finish can be imparted to the hair.

The combination use of the cationic surfactant as the component (A) and the component (B) in the aerosol stock solution and the combination use of the aerosol stock solution and the propellant (C) containing carbon dioxide can provide an aerosol composition that is excellent in storage stability without separation with the passage of time according to the functional mechanism described above, and thus may not be necessarily shaken immediately before use.

The number of carbon atoms of the linear saturated higher alcohol as the component (B) is preferably 12 or more and 22 or less, more preferably 12 or more and 18 or less, and further preferably 16 or more and 18 or less. Examples of the component (B) include lauryl alcohol, myristyl alcohol, cetyl alcohol, stearyl alcohol, and behenyl alcohol, and one kind or two or more kinds thereof may be used. Among these, one or more kind selected from the group consisting of lauryl alcohol, cetyl alcohol, and stearyl alcohol is preferred, one or more kind selected from the group consisting of cetyl alcohol and stearyl alcohol is more preferred, and stearyl alcohol is further preferably, from the standpoint of the enhancement of the storage stability and the standpoint of imparting the smooth use feeling and the good finish to the hair in the case where the aerosol composition is a hair cosmetic composition.

The difference between the number of carbon atoms of the long-chain alkyl in the component (A1) and the number of carbon atoms of the component (B) is preferably small from the standpoint of the further enhancement of the storage stability of the aerosol composition. In more detail, the difference between the number of carbon atoms of the long-chain alkyl in the component (A1) and the number of carbon atoms of the component (B) is preferably 6 or less, more preferably 4 or less, further preferably 2 or less, and still further preferably 0.

The content of the component (B) in the aerosol stock solution is preferably 1.5% by mass or more, more preferably 2.0% by mass or more, and further preferably 2.5% by mass or more, from the standpoint of the enhancement of the storage stability and the standpoint of imparting the smooth use feeling and the good finish to the hair in the case where the aerosol composition is a hair cosmetic composition. The content thereof is preferably 32% by mass or less, more preferably 25% by mass or less, further preferably 20% by mass or less, still further preferably 15% by mass or less, and still more further preferably 10% by mass or less, from the standpoint of the enhancement of the dischargeability of foam through aerosol effect. The specific range of the content of the component (B) in the aerosol stock solution is preferably 1.5 to 32% by mass, more preferably 2.0 to 25% by mass, further preferably 2.0 to 20% by mass, still further preferably 2.0 to 15% by mass, and still more further preferably 2.5 to 10% by mass.

The total content of the component (A) and the component (B) in the aerosol stock solution is preferably 1.5% by mass or more, more preferably 2.0% by mass or more, further preferably 2.5% by mass or more, still further preferably 3.0% by mass or more, and still more further preferably 4.0% by mass or more, from the standpoint of the enhancement of the storage stability and the standpoint of imparting the target capability to the aerosol composition. The total content thereof is preferably 32% by mass or less, more preferably 25% by mass or less, further preferably 20% by mass or less, still further preferably 15% by mass or less, and still more further preferably 12% by mass or less, from the standpoint of the enhancement of the dischargeability of foam through aerosol effect. The specific range of the total content of the component (A) and the component (B) in the aerosol stock solution is preferably 1.5 to 32% by mass, more preferably 2.0 to 25% by mass, further preferably 2.0 to 20% by mass, still further preferably 2.0 to 15% by mass, still more further preferably 2.5 to 12% by mass, still more further preferably 3.0 to 12% by mass, and still more further preferably 4.0 to 12% by mass.

The molar ratio [(B)/(A1)] of the component (B) with respect to the component (A1) in the aerosol stock solution is 3.0 or more from the standpoint of the enhancement of the storage stability according to the functional mechanism described above, and is 7.0 or less, preferably 6.0 or less, more preferably 5.0 or less, and further preferably 4.0 or less, from the standpoint of the miscibility with carbon dioxide in the propellant (C) and the standpoint of the enhancement of the dischargeability of foam through aerosol effect.

The molar ratio [(B)/(A)] of the component (B) with respect to the component (A) in the aerosol stock solution is preferably 2.9 or more, and more preferably 3.0 or more, from the standpoint of the enhancement of the storage stability according to the functional mechanism described above, and is 7.0 or less, preferably 6.0 or less, more preferably 5.0 or less, and further preferably 4.0 or less, from the standpoint of the miscibility with carbon dioxide in the propellant (C) and the standpoint of the enhancement of the dischargeability of foam through aerosol effect. The specific range of the molar ratio [(B)/(A)] of the component (B) with respect to the component (A) in the aerosol stock solution is 7.0 or less, preferably 2.9 to 7.0, more preferably 3.0 to 7.0, further preferably 3.0 to 5.0, and still further preferably 3.0 to 4.0.

<Aqueous Medium>

The aerosol stock solution generally contains an aqueous medium from the standpoint of dissolving or dispersing the component (A), the component (B), and the other additional components. Examples of the aqueous medium include water and an organic solvent. Examples of the organic solvent include a lower alcohol, such as ethanol and isopropyl alcohol; and a low molecular weight diol or triol having 6 or less carbon atoms, such as 1,3-butylene glycol, glycerin, ethylene glycol, propylene glycol, and dipropylene glycol. Among these, water is preferred as the aqueous medium.

The content of the aqueous medium in the aerosol stock solution is preferably 60% by mass or more, and more preferably 70% by mass or more, and is preferably 98% by mass or less, and more preferably 96% by mass or less, from the standpoint of dissolving or dispersing the component (A), the component (B), and the other additional components, and the standpoint of the enhancement of the dischargeability of foam and the quality of foam.

<Component (D): Nonionic Surfactant>

The aerosol stock solution constituting the aerosol composition of the present invention may further contain a nonionic surfactant as a component (D) from the standpoint of the enhancement of the miscibility with carbon dioxide in the propellant (C).

Examples of the component (D) include a polyoxyalkylene alkyl ether, a polyoxyalkylene alkenyl ether, a polyoxyalkylene sorbitan fatty acid ester, a polyoxyalkylene fatty acid ester, an alkyl glucoside, an alkyl alkanolamide, an alkyl glyceryl ether, a higher fatty acid sucrose ester, a polyglycerin fatty acid ester, a polyoxyalkylene hydrogenated castor oil, and an alkylsaccharide, and one kind or two or more kinds thereof may be used.

The alkyl group in the polyoxyalkylene alkyl ether, the alkyl glucoside, the alkyl alkanolamide, the alkyl glyceryl ether, and the alkylsaccharide, the alkenyl group in the polyoxyalkylene alkenyl ether, and the fatty acid in the polyoxyalkylene sorbitan fatty acid ester, polyoxyalkylene fatty acid ester, the higher fatty acid sucrose esters, and the polyglycerin fatty acid ester each preferably have 8 or more and 22 or less carbon atoms, more preferably 8 or more and 18 or less carbon atoms, and further preferably 8 or more and 12 or less carbon atoms.

Among the above, the nonionic surfactant is preferably one or more kind selected from the group consisting of a polyoxyalkylene alkyl ether, a polyoxyalkylene alkenyl ether, a polyoxyalkylene sorbitan fatty acid ester, a polyoxyalkylene fatty acid ester, an alkyl glucoside, an alkyl alkanolamide, an alkyl glyceryl ether, and a polyoxyalkylene hydrogenated castor oil, more preferably one or more kind selected from the group consisting of a polyoxyalkylene alkyl ether, an alkyl glucoside, an alkyl alkanolamide, an alkyl glyceryl ether, and a polyoxyalkylene hydrogenated castor oil, and further preferably an alkyl glucoside, from the standpoint of the enhancement of the miscibility of the aerosol stock solution and carbon dioxide in the propellant (C), and the standpoint of the use of the aerosol composition as a hair cosmetic composition.

Preferred examples of the polyoxyalkylene alkyl ether include a polyoxyethylene alkyl ether or a polyoxypropylene alkyl ether having an alkyl group having 8 or more and 22 or less carbon atoms, more preferably 8 or more and 18 or less carbon atoms, further preferably 8 or more and 12 or less carbon atoms. Specific examples thereof include "Emulgen 103" (laureth-3: PEG-3 lauryl ether), "Emulgen 116" (laureth-16: PEG-16 lauryl ether), "Emulgen 306P" (steareth-6: polyoxyethylene (6) stearyl ether), and "Kao Sofcare GP-1" (PPG-3 caprylyl ether), all produced by Kao Corporation.

Preferred examples of the alkyl glucoside include an alkyl glucoside having an alkyl group having 8 or more and 22 or less carbon atoms, more preferably 8 or more and 18 or less carbon atoms, further preferably 8 or more and 12 or less carbon atoms, and specific examples thereof include "Mydol 10" (decyl glucoside) and "AG-124" (lauryl glucoside), all produced by Kao Corporation.

Preferred examples of the alkyl alkanolamide include a fatty acid ethanolamide or a fatty acid diethanolamide having an acyl group having 8 or more and 22 or less carbon atoms, more preferably 8 or more and 18 or less carbon atoms, further preferably 8 or more and 12 or less carbon atoms, and specific examples thereof include "Aminone PK-02S" (palm kernel oil fatty acid diethanolamide), "Aminone L-02" (lauric acid diethanolamide), and "Aminone C-11S" (coconut oil fatty acid N-methylethanolamide), all produced by Kao Corporation.

Preferred examples of the alkyl glyceryl ether include an alkyl glyceryl ether having an alkyl group having 8 or more and 22 or less carbon atoms, more preferably 8 or more and 18 or less carbon atoms, further preferably 8 or more and 12 or less carbon atoms, and specific examples thereof include "Penetol GE-ID" (isodecyl glyceryl ether) produced by Kao Corporation.

Examples of the polyoxyalkylene hydrogenated castor oil include "Emanon CH-60K" (PEG-60 hydrogenated caster oil) produced by Kao Corporation.

In the case where the aerosol stock solution contains the component (D), the content of the component (D) in the aerosol stock solution is preferably 0.001% by mass or more, more preferably 0.002% by mass or more, and further preferably 0.003% by mass or more, from the standpoint of the enhancement of the miscibility of the aerosol stock solution and carbon dioxide in the propellant (C) and the standpoint of the use of the aerosol composition as a hair cosmetic composition, and is preferably 5.0% by mass or less, more preferably 3.0% by mass or less, further preferably 2.0% by mass or less, still further preferably 1.0% by mass or less, still more further preferably 0.5% by mass or less, from the standpoint of the enhancement of the storage stability. The specific range of the content of the component (D) in the aerosol stock solution is preferably 0.001 to 5.0% by mass, more preferably 0.002 to 3.0% by mass, further preferably 0.003 to 2.0% by mass, still further preferably 0.003 to 1.0% by mass, and still more further preferably 0.003 to 0.5% by mass.

The aerosol stock solution preferably contains one or more kind selected from the group consisting of the component (A2) and the component (D) from the standpoint of the enhancement of the miscibility of the aerosol stock solution and carbon dioxide in the propellant (C).

<Component (E): Nonionic Polymer>

The aerosol stock solution constituting the aerosol composition of the present invention may further contain a nonionic polymer as a component (E) from the standpoint of the enhancement of the miscibility with carbon dioxide in the propellant (C).

The weight average molecular weight (Mw) of the component (E) is preferably 10,000 or more, more preferably 50,000 or more, further preferably 100,000 or more, still further preferably 200,000 or more, still more further preferably 500,000 or more, and still more further preferably 1,000,000 or more, from the standpoint of the enhancement of the dischargeability of foam and the quality of foam and the standpoint of the enhancement of the miscibility with carbon dioxide in the propellant (C). The weight average molecular weight thereof is preferably 5,000,000 or less, more preferably 4,000,000 or less, and further preferably 3,500,000 or less, from the standpoint of the storage stability. The specific range of the weight average molecular weight of the component (E) is preferably 10,000 to 5,000,000, more preferably 50,000 to 5,000,000, further preferably 100,000 to 4,000,000, still further preferably 200,000 to 4,000,000, still more further preferably 500,000 to 3,500,000, and still more further preferably 1,000,000 to 3,500,000.

The weight average molecular weight of the component (E) can be measured, for example, by gel permeation chromatography (GPC) under the following condition.

Mobile phase: 50 mM LiBr, (1% $CH_3COOH$/ethanol)/(water)=3/7 (w/w)

Columns: TSKgel α-M (two columns in series) (produced by Tosoh Corporation)

Standard substance: polyethylene glycol

Examples of the nonionic polymer include a water soluble polysaccharide, such as starch, cellulose, guar gum, tara gum, locust bean gum, and glucomannan; a hydroxyalkylated water soluble polysaccharide, such as hydroxyethyl cellulose and hydroxypropyl cellulose; a high polymerization-degree polyalkylene glycol compound, such as a high polymerization-degree polyethylene glycol and a high polymerization-degree polyethylene glycol-polypropylene glycol copolymer; and a polyvinyl alcohol, and one kind or two or more kinds thereof may be used. The "high polymerization-degree referred herein preferably means that the weight average molecular weight thereof is in the aforementioned range.

Among the above, the nonionic polymer is preferably one or more kind selected form the group consisting of a water soluble polysaccharide, a hydroxyalkylated water soluble polysaccharide, and a high polymerization-degree polyalkylene glycol compound, more preferably one or more kind selected form the group consisting of starch, cellulose, guar gum, tara gum, locust bean gum, glucomannan, hydroxyethyl cellulose, hydroxypropyl cellulose, a high polymerization-degree polyethylene glycol, and a high polymerization-degree polyethylene glycol-polypropylene glycol copolymer, and further preferably one or more kind selected form the group consisting of hydroxyethyl cellulose, hydroxypropyl cellulose, a high polymerization-degree polyethylene glycol, and a high polymerization-degree polyethylene glycol-polypropylene glycol copolymer, from the standpoint of the solubility in the aerosol stock solution, the standpoint of the enhancement of the dischargeability of foam and the quality of foam, and the standpoint of the enhancement of the miscibility with carbon dioxide in the propellant (C).

The component (E) more preferably contains one or more kind selected form the group consisting of hydroxyethyl cellulose and a high polymerization-degree polyethylene glycol from the standpoint of the solubility in the aerosol stock solution, the standpoint of the enhancement of the dischargeability of foam and the quality of foam, and the standpoint of the enhancement of the miscibility with carbon dioxide in the propellant (C).

In the case where the aerosol stock solution contains the component (E), the content of the component (E) in the aerosol stock solution is preferably 0.01% by mass or more, more preferably 0.05% by mass or more, and further preferably 0.1% by mass or more, from the standpoint of the enhancement of the dischargeability of foam and the quality of foam and the standpoint of the enhancement of the miscibility with carbon dioxide in the propellant (C). The content thereof is preferably 5% by mass or less, more preferably 2% by mass or less, further preferably 1% by mass or less, and still further preferably 0.5% by mass or less, from the standpoint of regulating the aerosol stock solution to have a suitable viscosity and the standpoint of the storage stability. The specific range of the content of the component (E) in the aerosol stock solution is preferably 0.01 to 5% by mass, more preferably 0.05 to 2% by mass, further preferably 0.1 to 1% by mass, and still further preferably 0.1 to 0.5% by mass.

<Additional Components>

The aerosol stock solution may appropriately contain additional components in such a range that does not impair the object of the present invention. Examples of the components include components that have been generally mixed in cosmetics and the like, for example, an anionic surfactant, an amphoteric surfactant, an organic acid or a salt thereof, an aromatic ring-containing monohydric alcohol, an antioxidant, an oil other than the component (B), a polymer other than the component (E), a silicone, an antidandruff agent, a vitamin agent, an antimicrobial agent, an anti-inflammatory agent, an antiseptic agent, a chelating agent, a moisturizing agent, a pearlescent agent, a ceramide compound, a perfume, an ultraviolet ray absorbent, a pH modifier, and a vegetable extract.

The aerosol stock solution constituting the aerosol composition of the present invention does not exclude a branched chain higher alcohol contained therein in such a range that does not impair the effects of the present invention, but the content thereof is preferably small from the standpoint of the enhancement of the storage stability. Specifically, the content of the branched chain higher alcohol in the aerosol stock solution is preferably less than 3% by mass, more preferably less than 2% by mass, further preferably less than 1% by mass, still further preferably less than 0.5% by mass, still more further preferably less than 0.1% by mass, and still more further preferably 0% by mass.

The production method of the aerosol stock solution is not particularly limited, and the aerosol stock solution can be produced by blending and mixing the component (A), the component (B), and the other additional components used depending on necessity, by an ordinary method.

<Component (C): Propellant>

The propellant (C) constituting the aerosol composition of the present invention contains carbon dioxide. The component (C) that contains carbon dioxide enables discharge of fine dense foam.

The content of carbon dioxide in the component (C) is preferably 50% by mass or more, more preferably 70% by mass or more, further preferably 80% by mass or more, still further preferably 90% by mass or more, and still more further preferably 100% by mass, from the standpoint of the enhancement of the quality of foam and the enhancement of the care effect on the skin and the hair. Accordingly, it is preferred that the propellant (C) is formed only of carbon dioxide.

The component (C) may contain a liquified gas, such as nitrogen, propane, n-butane, isobutane, a liquefied petroleum gas (LPG) as a mixture of these compounds, dimethyl ether, and isopentane, as a propellant other than carbon dioxide, in such a range that does not impair the effects of the present invention.

The charge amount of the propellant (C) in the aerosol composition of the present invention assuming that the total amount of the aerosol stock solution and the propellant (C) is 100% by mass is preferably 0.5% by mass or more, and more preferably 1% by mass or more, and is preferably 5% by mass or less, and more preferably 3% by mass or less, from the standpoint of the enhancement of the dischargeability of foam and the quality of foam and the standpoint of the achievement of a suitable discharge velocity. The specific range of the charge amount of the propellant (C) assuming that the total amount of the aerosol stock solution and the propellant (C) is 100% by mass is preferably 0.5 to 5% by mass, and more preferably 1 to 3% by mass.

The inner pressure of the aerosol container after charging the propellant (C) at 25° C. is regulated preferably to 0.1 MPa or more, and more preferably to 0.3 MPa or more, and is regulated preferably to 1.3 MPa or less, and more preferably to 1.0 MPa or less, for the achievement of a suitable discharge velocity. The specific range of the inner pressure of the aerosol container after charging the propellant (C) is preferably 0.1 to 1.3 MPa, and more preferably 0.3 to 1.0 MPa.

<Aerosol Container>

The aerosol composition of the present invention used after charging in an aerosol container. Examples of the aerosol container include a known pressure resistant container, such as a metal container and a resin container, and a double structure container including a pressure resistant container having an inner bag housed therein. In the double structure container, it is preferred that the aerosol stock solution is housed in the inner bag, and the propellant (C) is charged between the pressure resistant container and the inner bag.

The preparation method of the aerosol composition of the present invention is not particularly limited. For example, the aerosol composition can be prepared in such a manner that the aerosol stock solution is charged in the pressure resistant container constituting the aerosol container, followed by attaching a valve thereto, and then the propellant (C) is charged through the valve.

<Use Method of Aerosol Composition>

The use method of the aerosol composition of the present invention is not particularly limited, as far as the method includes steps of discharging the composition in the form of foam from an aerosol container, and applying the composition to an object. In the case where the aerosol composition is a hair cosmetic composition, the method includes steps of discharging the composition in the form of foam from an aerosol container, and applying the composition to the hair.

The composition discharged in the form of foam may be applied to the dried hair or may be applied to the wet hair depending on the kind of the hair cosmetic composition.

For example, in the case where the aerosol composition of the present invention is a hair cleanser composition, examples of the use method include a method including steps of applying the hair cleanser composition discharged in the form of foam to the hair, and cleansing the hair. The step of cleansing the hair may include an operation of foaming the hair cleanser composition on the hair and then an operation of rinsing out the hair cleansing composition.

In the case where the aerosol composition of the present invention is a hair cosmetic composition, such as a hair rinse, a hair conditioning agent and a hair treatment agent, examples of the use method include a method including steps of applying and adapting the hair cosmetic composition discharged in the form of foam from the aerosol container to the hair in a wet state or a dry state after cleansing, and then rinsing out the composition depending on necessity.

The composition discharged in the form of foam contains carbon dioxide gas, can be uniformly spread over the entire object with good applicability, and can be sufficiently adapted thereto. Therefore, the use of the aerosol composition of the present invention onto the hair, for example, by the aforementioned method can allow the effective ingredients to penetrate easily to the hair.

In the case where the aerosol composition is a hair cosmetic composition, the amount of the hair cosmetic composition applied to the hair in terms of mass ratio with respect to the mass of the hair (mass of hair cosmetic composition/mass of hair) is preferably 0.002 or more, and more preferably 0.003 or more, and is preferably 0.6 or less, and more preferably 0.5 or less. The hair to be the object of treatment may be at least a part of the head hair.

In relation to the aforementioned embodiments, the present invention further discloses the following embodiments.

<1>

An aerosol composition containing
an aerosol stock solution containing a cationic surfactant (A) and a linear saturated higher alcohol (B), and
a propellant (C) containing carbon dioxide,
the component (A) containing a mono-long-chain-alkyl type cationic surfactant (A1),
a content of the component (A) being 0.9% by mass or more and less than 6.0% by mass,
a molar ratio [(B)/(A1)] of the component (B) with respect to the component (A1) being 3.0 or more and 7.0 or less.

<2>

The aerosol composition according to the item <1>, wherein the component (A1) is one or more kind selected from the group consisting of an alkyltrimethylammonium salt (A1-1), an alkoxyalkyltrimethylammonium salt (A1-2), an alkylamidoalkyltrimethylammonium salt (A1-3), an alkyldimethylamine and a salt thereof (A1-4), an alkoxyalkyldimethylamine and a salt thereof (A1-5), and an alkylamidoalkyldimethylamine and a salt thereof (A1-6), preferably one or more kind selected from the group consisting of an alkyldimethylamine and a salt thereof (A1-4), an alkoxyalkyldimethylamine and a salt thereof (A1-5), and an alkylamidoalkyldimethylamine and a salt thereof (A1-6), more preferably one or more kind selected from the group consisting of an alkoxyalkyldimethylamine and a salt thereof (A1-5) an and alkylamidoalkyldimethylamine and a salt thereof (A1-6), and further preferably one or more kind selected from the group consisting of N,N-dimethyl-3-octadecyloxypropylamine and stearic acid dimethylaminopropylamide.

<3>

The aerosol composition according to the item <1> or <2>, wherein the content of the component (A1) in the aerosol stock solution is preferably 0.9 to 5.0% by mass, more preferably 0.9 to 5.0% by mass, further preferably 0.9 to 4.0% by mass, still further preferably 0.9 to 3.5% by mass, still more further preferably 0.9 to 3.0% by mass, still more further preferably 0.9 to 2.5% by mass, still more further preferably 1.0 to 2.5% by mass, still more further preferably 1.2 to 2.5% by mass, and still more further preferably 1.3 to 2.5% by mass.

<4>

The aerosol composition according to any one of the items <1> to <3>, wherein the content of the component (A1) in the component (A) is preferably 50% by mass or more, more preferably 60% by mass or more, further preferably 70% by mass or more, still further preferably 80% by mass or more, and still more further preferably 90% by mass or more, and is 100% by mass or less.

<5>

The aerosol composition according to any one of the items <1> to <4>, wherein the component (A) contains a di-long-chain-alkyl type cationic surfactant (A2), preferably a dialkyldimethylammonium salt, and more preferably one or more kind selected from the group consisting of distearyldimethylammonium chloride and a dialkyl(C12-18) dimethylammonium chloride.

<6>

The aerosol composition according to the item <5>, wherein the content of the component (A2) in the aerosol stock solution is preferably 0.001 to 2.0% by mass, more preferably 0.001 to 1.5% by mass, further preferably 0.001 to 1.0% by mass, still further preferably 0.005 to 1.0% by mass, still more further preferably 0.01 to 1.0% by mass, still more further preferably 0.01 to 0.5% by mass, and still more further preferably 0.01 to 0.2% by mass.

<7>

The aerosol composition according to any one of the items <1> to <6>, wherein the content of the component (A) in the aerosol stock solution is preferably 0.9 to 5.0% by mass, more preferably 0.9 to 4.0% by mass, further preferably 0.9 to 3.5% by mass, still further preferably 1.0 to 3.5% by mass, still more further preferably 1.2 to 3.5% by mass, and still more further preferably 1.3 to 3.5% by mass.

<8>

The aerosol composition according to any one of the items <1> to <7>, wherein the component (B) is one or more kind selected from the group consisting of lauryl alcohol, myristyl alcohol, cetyl alcohol, stearyl alcohol, and behenyl alcohol, preferably one or more kind selected from the group consisting of lauryl alcohol, cetyl alcohol, and stearyl alcohol, more preferably one or more kind selected from the group consisting of cetyl alcohol and stearyl alcohol, and still more preferably stearyl alcohol.

<9>

The aerosol composition according to any one of the items <1> to <8>, wherein the difference between the number of carbon atoms of the long-chain alkyl in the component (A1) and the number of carbon atoms of the component (B) is preferably 6 or less, more preferably 4 or less, further preferably 2 or less, and still further preferably 0.

<10>

The aerosol composition according to any one of the items <1> to <9>, wherein the content of the component (B) in the aerosol stock solution is preferably 1.5 to 32% by mass, more preferably 2.0 to 25% by mass, further preferably 2.0 to 20% by mass, still further preferably 2.0 to 15% by mass, and still more further preferably 2.5 to 10% by mass.

<11>

The aerosol composition according to any one of the items <1> to <10>, wherein the total content of the component (A) and the component (B) in the aerosol stock solution is preferably 1.5 to 32% by mass, more preferably 2.0 to 25% by mass, further preferably 2.0 to 20% by mass, still further preferably 2.0 to 15% by mass, still more further preferably 2.5 to 12% by mass, still more further preferably 3.0 to 12% by mass, and still more further preferably 4.0 to 12% by mass.

<12>

The aerosol composition according to any one of the items <1> to <11>, wherein the molar ratio [(B)/(A1)] of the component (B) with respect to the component (A1) in the aerosol stock solution is 3.0 or more and 7.0 or less, preferably 6.0 or less, more preferably 5.0 or less, and further preferably 4.0 or less.

<13>

The aerosol composition according to any one of the items <1> to <12>, wherein the molar ratio [(B)/(A)] of the component (B) with respect to the component (A) in the aerosol stock solution is 7.0 or less, preferably 2.9 to 7.0, more preferably 3.0 to 7.0, further preferably 3.0 to 5.0, and still further preferably 3.0 to 4.0.

<14>

The aerosol composition according to any one of the items <1> to <13>, wherein the aerosol stock solution contains an aqueous medium in an amount of preferably 60% by mass or more, and more preferably 70% by mass or more, and in an amount of preferably 98% by mass or less, and more preferably 96% by mass or less.

<15>

The aerosol composition according to the item <14>, wherein the aqueous medium is one or more kind selected from the group consisting of water, a lower alcohol, and a low molecular weight diol or triol having 6 or less carbon atoms, preferably one or more kind selected from the group consisting of water, ethanol, isopropyl alcohol, 1,3-butylene glycol, glycerin, ethylene glycol, propylene glycol, and dipropylene glycol, and more preferably water.

<16>

The aerosol composition according to any one of the items <1> to <15>, further containing a nonionic surfactant, preferably one or more kind selected from the group consisting of a polyoxyalkylene alkyl ether, a polyoxyalkylene alkenyl ether, a polyoxyalkylene sorbitan fatty acid ester, a polyoxyalkylene fatty acid ester, an alkyl glucoside, an alkyl alkanolamide, an alkyl glyceryl ether, and a polyoxyalkylene hydrogenated castor oil, more preferably one or more kind selected from the group consisting of a polyoxyalkylene alkyl ether, an alkyl glucoside, an alkyl alkanolamide, an alkyl glyceryl ether, and a polyoxyalkylene hydrogenated castor oil, and further preferably an alkyl glucoside, as a component (D).

<17>

The aerosol composition according to the item <16>, wherein the alkyl glucoside is an alkyl glucoside having an alkyl group having preferably 8 or more and 22 or less carbon atoms, more preferably 8 or more and 18 or less carbon atoms, further preferably 8 or more and 12 or less carbon atoms.

<18>

The aerosol composition according to the item <16> or <17>, wherein the content of the component (D) in the aerosol stock solution is preferably 0.001 to 5.0% by mass, more preferably 0.002 to 3.0% by mass, further preferably 0.003 to 2.0% by mass, still further preferably 0.003 to 1.0% by mass, and still more further preferably 0.003 to 0.5% by mass.

<19>

The aerosol composition according to any one of the items <16> to <18>, wherein the aerosol stock solution contains one or more kind selected from the group consisting of the component (A2) and the component (D).

<20>

The aerosol composition according to any one of the items <1> to <19>, wherein the aerosol stock solution further contains a nonionic polymer, preferably one or more kind selected from the group consisting of a water soluble polysaccharide, a hydroxyalkylated water soluble polysaccharide, and a high polymerization-degree polyalkylene glycol compound, more preferably one or more kind selected from the group consisting of starch, cellulose, guar gum, tara gum, locust bean gum, glucomannan, hydroxyethyl cellulose, hydroxypropyl cellulose, a high polymerization-degree polyethylene glycol, and a high polymerization degree polyethylene glycol-polypropylene glycol copolymer, further preferably one or more kind selected from the group consisting of hydroxyethyl cellulose, hydroxypropyl cellulose, a high polymerization-degree polyethylene glycol, and a high polymerization-degree polyethylene glycol-polypropylene glycol copolymer, and still further preferably one or more kind selected from the group consisting of hydroxyethyl cellulose and a high polymerization-degree polyethylene glycol, as a component (E).

<21>

The aerosol composition according to the item <20>, wherein the weight average molecular weight of the component (E) is preferably 10,000 to 5,000,000, more preferably 50,000 to 5,000,000, further preferably 100,000 to 4,000,000, still further preferably 200,000 to 4,000,000, still more further preferably 500,000 to 3,500,000, and still more further preferably 1,000,000 to 3,500,000.

<22>

The aerosol composition according to the item <20> or <21>, wherein the content of the component (E) in the aerosol stock solution is preferably 0.01 to 5% by mass, more preferably 0.05 to 2% by mass, further preferably 0.1 to 1% by mass, and still further preferably 0.1 to 0.5% by mass.

<23>

The aerosol composition according to any one of the items <1> to <22>, wherein the content of a branched chain higher alcohol in the aerosol stock solution is preferably less than 3% by mass, more preferably less than 2% by mass, further preferably less than 1% by mass, still further preferably less than 0.5% by mass, still more further preferably less than 0.1% by mass, and still more further preferably 0% by mass.

<24>

The aerosol composition according to any one of the items <1> to <23>, wherein the content of carbon dioxide in the component (C) is preferably 50% by mass or more, more preferably 70% by mass or more, further preferably 80% by mass or more, still further preferably 90% by mass or more, and still more further preferably 100% by mass.

<25>

The aerosol composition according to any one of the items <1> to <24>, wherein the charge amount of the propellant (C) in the aerosol composition assuming that the total amount of the aerosol stock solution and the propellant (C) is 100% by mass is preferably 0.5 to 5% by mass, and more preferably 1 to 3% by mass.

<26>

The aerosol composition according to any one of the items <1> to <25>, wherein the aerosol composition is a hair cosmetic composition, preferably a hair cleanser, a hair rinse, a hair conditioning agent, a hair treatment agent, a hair styling agent, a hair dye, or a hair growth agent, more preferably a hair rinse, a hair conditioning agent, a hair treatment agent, or a hair styling agent, and further preferably a hair rinse, a hair conditioning agent or a hair treatment agent.

<27>

A method for using the aerosol composition according to any one of the items <1> to <26> including steps of discharging the composition in the form of foam from an aerosol container, and applying the composition to an object.

<28>

Use of a composition as an aerosol stock solution,
the composition containing a cationic surfactant (A) and a linear saturated higher alcohol (B),
the component (A) containing a mono-long-chain-alkyl type cationic surfactant (A1),
a content of the component (A) being 0.9% by mass or more and less than 6.0% by mass,
a molar ratio [(B)/(A1)] of the component (B) with respect to the component (A1) being 3.0 or more and 7.0 or less.

<29>

The use according to the item <28>, wherein the aerosol stock solution is an aerosol stock solution of an aerosol composition containing a propellant (C) containing carbon dioxide.

EXAMPLES

The present invention will be described with reference to examples below, but the present invention is not limited to the range of the examples.

Examples 1 to 14 and Comparative Examples 1 to 3

(Production and Evaluation of Aerosol Conditioner)

The components to be blended in the aerosol stock solution were mixed according to the composition shown in the tables, and then uniformly mixed to prepare the aerosol stock solution. Subsequently, 50 g of the aerosol stock solution and the propellant (C) shown in the tables were charged in a transparent pressure resistant container having a capacity of 100 mL (produced by Toyo Seikan Kaisha, Ltd.) to make the mass ratio shown in the tables, so as to produce an aerosol conditioner. The inner pressure of the aerosol container after charging the propellant was regulated to a range of 0.55 to 0.85 MPa.

The aerosol conditioner thus produced was evaluated in the following manners. The results are shown in the tables.

The mixing amounts shown in the tables are the active ingredient amounts (% by mass) of the components.

(Stability)

The aerosol conditioner of each of the examples obtained by charging the aerosol stock solution and the propellant in the transparent pressure resistant container was allowed to stand still in an explosion-proof storage at 45° C., and the appearance of the contents of the pressure resistant container was visually observed and evaluated by the following three-stage evaluation standard.

[Evaluation Standard]
- A: Separation and precipitation were not observed after 90 days.
- B: Separation and precipitation were not observed after 3 days, but separation or precipitation was observed within 90 days.
- C: Separation or precipitation was observed within 3 days.

(Miscibility of Aerosol Stock Solution and Carbon Dioxide Gas)

In charging the aerosol stock solution and the propellant in the transparent pressure resistant container, the period of time until the prescribed amount of carbon dioxide gas (2.2% by mass) had been charged was evaluated by the following four-stage evaluation standard. A shorter period of time until the prescribed amount of carbon dioxide gas is charged means higher miscibility of the aerosol stock solution and carbon dioxide gas.

[Evaluation Standard]
- AA: The period of time until the prescribed amount of carbon dioxide gas had been charged was 60 seconds or less.
- A: The period of time until the prescribed amount of carbon dioxide gas had been charged was 60 seconds or more and 120 seconds or less.
- B: The period of time until the prescribed amount of carbon dioxide gas had been charged was 120 seconds or more and 180 seconds or less.
- C: The period of time until the prescribed amount of carbon dioxide gas had been charged was 180 seconds or more.

TABLE 1

|  |  |  | Example 1 | 2 | 3 | 4 | 5 | 6 | 7 | 8 | 9 |
|---|---|---|---|---|---|---|---|---|---|---|---|
| Composition of aerosol stock solution (% by mass) | (A1) | N,N-Dimethyl-3-octadecyloxy-propylamine | 1.98 | 1.98 | 1.98 | 1.98 | 1.98 | 1.98 | 1.98 | 1.98 | 1.98 |
|  |  | Stearic acid dimethylamino-propylamide |  |  |  |  |  |  |  |  |  |
|  | (A2) | Dialkyl(C12-C18)di-methylammonium chloride |  |  |  |  |  | 0.015 | 0.075 | 0.375 | 0.585 |
|  | (B) | Stearyl alcohol | 5.52 | 5.52 | 5.52 | 5.52 | 5.52 | 5.52 | 5.52 | 5.52 | 5.52 |
|  |  | Cetyl alcohol |  |  |  |  |  |  |  |  |  |
|  |  | C16-C18 Linear saturated higher alcohol |  |  |  |  |  |  |  |  |  |
|  | (B') | Isostearyl alcohol |  |  |  |  |  |  |  |  |  |
|  | (D) | Lauryl glucoside |  | 0.008 | 0.04 | 0.20 | 0.40 |  |  |  |  |
|  |  | Lactic acid | 0.73 | 0.73 | 0.73 | 0.73 | 0.73 | 0.73 | 0.73 | 0.73 | 0.73 |
|  |  | Benzyl alcohol |  |  |  |  |  |  |  |  |  |
|  |  | Phenoxyethanol |  |  |  |  |  |  |  |  |  |
|  |  | N,N-bis(3-methoxypropyl)iso-docosanediamide |  |  |  |  |  |  |  |  |  |
|  |  | Purified water | 91.77 | 91.76 | 91.73 | 91.57 | 91.37 | 91.76 | 91.70 | 91.40 | 91.19 |
|  |  | Total | 100.00 | 100.00 | 100.00 | 100.00 | 100.00 | 100.00 | 100.00 | 100.00 | 100.00 |
|  |  | Content of component (A) (% by mass) | 1.98 | 1.98 | 1.98 | 1.98 | 1.98 | 2.00 | 2.06 | 2.36 | 2.57 |
|  |  | Content of component (A1) (% by mass) | 1.98 | 1.98 | 1.98 | 1.98 | 1.98 | 1.98 | 1.98 | 1.98 | 1.98 |
|  |  | Content of component (A2) (% by mass) | 0.00 | 0.00 | 0.00 | 0.00 | 0.00 | 0.015 | 0.075 | 0.375 | 0.585 |
|  |  | Content of component (A1) in component (A) (% by mass) | 100.00 | 100.00 | 100.00 | 100.00 | 100.00 | 99.25 | 96.35 | 84.08 | 77.19 |
|  |  | Content of component (B) (% by mass) | 5.52 | 5.52 | 5.52 | 5.52 | 5.52 | 5.52 | 5.52 | 5.52 | 5.52 |
|  |  | Mass ratio [B/A] | 2.79 | 2.79 | 2.79 | 2.79 | 2.79 | 2.77 | 2.69 | 2.34 | 2.15 |
|  |  | Total content of components (A) and (B) (% by mass) | 7.50 | 7.50 | 7.50 | 7.50 | 7.50 | 7.52 | 7.58 | 7.88 | 8.09 |
|  |  | Component (A1) mol | 0.0056 | 0.0056 | 0.0056 | 0.0056 | 0.0056 | 0.0056 | 0.0056 | 0.0056 | 0.0056 |
|  |  | Component (A2) mol | 0.0000 | 0.0000 | 0.0000 | 0.0000 | 0.0000 | 0.0000 | 0.0002 | 0.0008 | 0.0012 |
|  |  | Component (B) mol | 0.020 | 0.020 | 0.020 | 0.020 | 0.020 | 0.020 | 0.020 | 0.020 | 0.020 |
|  |  | Molar ratio [(B)/(A)] | 3.7 | 3.7 | 3.7 | 3.7 | 3.7 | 3.6 | 3.6 | 3.2 | 3.0 |
|  |  | Molar ratio [(B)/(A1)] | 3.7 | 3.7 | 3.7 | 3.7 | 3.7 | 3.7 | 3.7 | 3.7 | 3.7 |
| Composition of aerosol conditioner |  | Aerosol stock solution (% by mass) | 97.8 | 97.8 | 97.8 | 97.8 | 97.8 | 97.8 | 97.8 | 97.8 | 97.8 |
|  | (C) | Carbon dioxide (% by mass) | 2.2 | 2.2 | 2.2 | 2.2 | 2.2 | 2.2 | 2.2 | 2.2 | 2.2 |

TABLE 1-continued

|  |  | Example | | | | | | | | |
|---|---|---|---|---|---|---|---|---|---|---|
|  |  | 1 | 2 | 3 | 4 | 5 | 6 | 7 | 8 | 9 |
| Evaluation result | Stability | A | A | A | A | A | A | A | B | B |
|  | Miscibility of aerosol stock solution and carbon dioxide gas | B | A | A | A | A | A | A | A | A |

TABLE 2

| | | | Example 10 | Comparative Example 1 | Example 11 | Example 12 | Example 13 | Example 14 | Comparative Example 2 | Comparative Example 3 |
|---|---|---|---|---|---|---|---|---|---|---|
| Composition of aerosol stock solution (% by mass) | (A1) | N,N-Dimethyl-3-octadecyloxypropylamine | 1.53 | 1.53 | | 1.35 | 1.35 | 1.35 | 1.35 | 0.45 |
| | | Stearic acid dimethylaminopropylamide | | | 1.53 | | | | | |
| | (A2) | Dialkyl(C12-C18)dimethylammonium chloride | | | | | | | | |
| | (B) | Stearyl alcohol | 3.77 | 3.26 | 3.40 | 3.25 | 0.15 | 0.15 | 0.15 | 1.10 |
| | | Cetyl alcohol | | | | | 2.80 | | | |
| | | C16-C18 Linear saturated higher alcohol | | | | | | 2.90 | | |
| | (B') | Isostearyl alcohol | | | | | | | 3.10 | |
| | (D) | Lauryl glucoside | | | | | | | | |
| | | Lactic acid | 0.60 | 0.60 | 0.61 | 0.56 | 0.56 | 0.56 | 0.56 | 0.29 |
| | | Benzyl alcohol | 0.30 | 0.30 | 0.30 | | | | | |
| | | Phenoxyethanol | 0.60 | 0.60 | 0.60 | | | | | |
| | | N,N-bis(3-methoxypropyl)isodocosanediamide | 1.00 | 1.00 | 1.00 | | | | | |
| | | Purified water | 92.20 | 92.71 | 92.56 | 94.84 | 95.14 | 95.04 | 94.84 | 98.16 |
| | | Total | 100.00 | 100.00 | 100.00 | 100.00 | 100.00 | 100.00 | 100.00 | 100.00 |
| | | Content of component (A) (% by mass) | 1.53 | 1.53 | 1.53 | 1.35 | 1.35 | 1.35 | 1.35 | 0.45 |
| | | Content of component (A1) (% by mass) | 1.53 | 1.53 | 1.53 | 1.35 | 1.35 | 1.35 | 1.35 | 0.45 |
| | | Content of component (A2) (% by mass) | 0.00 | 0.00 | 0.00 | 0.00 | 0.00 | 0.00 | 0.00 | 0.00 |
| | | Content of component (A1) in component (A) (% by mass) | 100.00 | 100.00 | 100.00 | 100.00 | 100.00 | 100.00 | 100.00 | 100.00 |
| | | Content of component (B) (% by mass) | 3.77 | 3.26 | 3.40 | 3.25 | 2.95 | 3.05 | 0.15 | 1.10 |
| | | Mass ratio [B/A] | 2.46 | 2.13 | 2.22 | 2.41 | 2.19 | 2.26 | 0.11 | 2.44 |
| | | Total content of components (A) and (B) (% by mass) | 5.30 | 4.79 | 4.93 | 4.60 | 4.30 | 4.40 | 1.50 | 1.55 |
| | | Component (A1) mol | 0.0043 | 0.0043 | 0.0042 | 0.0038 | 0.0038 | 0.0038 | 0.0038 | 0.0013 |
| | | Component (A2) mol | 0.0000 | 0.0000 | 0.0000 | 0.0000 | 0.0000 | 0.0000 | 0.0000 | 0.0000 |
| | | Component (B) mol | 0.014 | 0.012 | 0.013 | 0.012 | 0.012 | 0.012 | 0.001 | 0.004 |
| | | Molar ratio [(B)/(A)] | 3.2 | 2.8 | 3.0 | 3.2 | 3.2 | 3.2 | 0.1 | 3.2 |
| | | Molar ratio [(B)/(A1)] | 3.2 | 2.8 | 3.0 | 3.2 | 3.2 | 3.2 | 0.1 | 3.2 |
| Composition of aerosol conditioner | | Aerosol stock solution (% by mass) | 97.8 | 97.8 | 97.8 | 97.8 | 97.8 | 97.8 | 97.8 | 97.8 |
| | (C) | Carbon dioxide (% by mass) | 2.2 | 2.2 | 2.2 | 2.2 | 2.2 | 2.2 | 2.2 | 2.2 |
| Evaluation result | | Stability | A | C | A | A | B | B | C | C |
| | | Miscibility of aerosol stock solution and carbon dioxide gas | AA | AA | AA | AA | AA | AA | AA | AA |

The components used in the tables were as follows.

<Mono-Long-Chain-Alkyl Type Cationic Surfactant (A1)>

N,N-dimethyl-3-octadecyloxypropylamine: "Farmin DM-E80", produced by Kao Corporation, active ingredient amount: 90% by mass Stearic acid dimethylaminopropylamide: "Nikkol Amidoamine MPS", produced by Nikko Chemicals Co., Ltd., active ingredient amount: 100% by mass <Di-Long-Chain-Alkyl Type Cationic Surfactant (A2)>

Dialkyl(C12-C18)dimethylammonium chloride: "Quartamin D-2345P", produced by Kao Corporation, active ingredient amount: 75% by mass <Linear Saturated Higher Alcohol (B)>

Stearyl alcohol: "Kalcol 8098", produced by Kao Corporation

Cetyl alcohol: "Kalcol 6098", produced by Kao Corporation

C16-C18 Linear saturated higher alcohol: "Kalcol 6870", produced by Kao Corporation <Branched Chain Higher Alcohol (B')>

Isostearyl alcohol, produced by Kokyu Alcohol Kogyo Co., Ltd.

<Nonionic Surfactant (D)>

Lauryl glucoside: "AG-124", produced by Kao Corporation

<Additional Components>

Lactic acid, produced by Purac Thailand, Ltd., 90% lactic acid

Benzyl alcohol, produced by Valtris Specialty Chemicals, Ltd. (HQ)

Phenoxyethanol, produced by The Dow Chemical Company

N,N-bis(3-methoxypropyl) isodocosanediamide: "BRS661", produced by Kao Corporation As shown in the tables, the aerosol conditioners of Examples were excellent in storage stability in the state where the propellant containing carbon dioxide was charged.

On the other hand, Comparative Example 1 where the molar ratio [(B)/(A1)] in the aerosol stock solution was less than 3.0, Comparative Example 2 where a part of the component (B) in the aerosol stock solution was replaced by a branched chain saturated higher alcohol, and Comparative Example 3 where the content of the component (A) in the aerosol stock solution was less than 0.9% by mass were inferior in storage stability.

(Example Prescription 1) Aerosol Conditioner

| <Composition of Aerosol Stock Solution> (% by mass) | |
|---|---|
| (A1) N,N-dimethyl-3-octadecyloxypropylamine ("Farmin DM-E80", produced by Kao Corporation) | 2.5 |
| (B) Stearyl alcohol ("Kalcol 8098", produced by Kao Corporation) | 7.5 |
| (E) High polymerization- degree polyethylene glycol ("Polyox WSR N-60K" (produced by The Dow Chemical Company, weight average molecular weight: 2,000,000) | 0.25 |
| Benzyl alcohol (produced by Valtris Specialty Chemicals, Ltd. (HQ) | 0.3 |
| Phenoxy ethanol ("Neolone PH100", produced by The Dow Chemical Company) | 0.6 |
| Lactic acid (produced by Purac Thailand, Ltd., 90% lactic acid) | 0.85 |
| Perfume | adequate amount |
| Purified water | balance |
| Total | 100.0 |

| <Composition of Aerosol Conditioner> (% by mass) | |
|---|---|
| Aerosol stock solution | 97.8 |
| (C) Carbon dioxide | 2.2 |
| Total | 100.0 |

(Example Prescription 2) Aerosol Conditioner

| <Composition of Aerosol Stock Solution> (% by mass) | |
|---|---|
| (A1) N,N-dimethyl-3-octadecyloxypropylamine ("Farmin DM-E80", produced by Kao Corporation) | 0.9 |
| (B) Stearyl alcohol ("Kalcol 8098", produced by Kao Corporation) | 1.85 |
| (E) High polymerization- degree polyethylene glycol ("Polyox WSR N-60K" (produced by The Dow Chemical Company, weight average molecular weight: 2,000,000) | 0.1 |
| (E) Hydroxyethyl cellulose ("HEC Daicel SE850K", produced by Daicel Finechem, Ltd., weight average molecular weight: 1,500,000) | 0.1 |
| Benzyl alcohol (produced by Valtris Specialty Chemicals, Ltd. (HQ) | 0.3 |
| Phenoxy ethanol ("Neolone PH100", produced by The Dow Chemical Company) | 0.6 |
| Lactic acid (produced by Purac Thailand, Ltd., 90% lactic acid) | 0.85 |
| Perfume | adequate amount |
| Purified water | balance |
| Total | 100.0 |

| <Composition of Aerosol Conditioner> (% by mass) | |
|---|---|
| Aerosol stock solution | 97.8 |
| (C) Carbon dioxide | 2.2 |
| Total | 100.0 |

INDUSTRIAL APPLICABILITY

According to the present invention, an aerosol composition that contains an aerosol stock solution containing a cationic surfactant and a higher alcohol in high concentrations, and a propellant containing carbon dioxide, is excellent in storage stability, and may not be necessarily shaken immediately before use.

The invention claimed is:

1. An aerosol composition, comprising:
an aerosol stock solution comprising a cationic surfactant (A) and stearyl alcohol (B); and
a propellant (C) comprising carbon dioxide, wherein the component (A) comprises one or more mono-long-chain-alkyl cationic surfactants (A1) selected from the group consisting of N,N-dimethyl-3-octadecyloxypropylamine and stearic acid dimethylaminopropylamide,
a content of the component (A) is from 1.0% to 3.5% by mass in the aerosol stock solution,
a content of the component (B) is from 2.5% to 10% by mass in the aerosol stock solution,
a molar ratio [(B)/(A1)] of the component (B) with respect to the component (A1) is from 3.0 to 4.0 in the aerosol stock solution,
a content of the component (A1) in the component (A) is from 90% by mass to 100% by mass, and
a difference between a number of carbon atoms of the long-chain alkyl in the component (A1) and the number of carbon atoms of the component (B) is 0.

2. The aerosol composition according to claim 1, wherein the aerosol stock solution further comprises a nonionic surfactant as a component (D).

3. The aerosol composition according to claim 1, wherein the aerosol stock solution further comprises a nonionic polymer as a component (E).

4. The aerosol composition according to claim 1, wherein the aerosol composition has a content of carbon dioxide in the component (C) of 50% by mass or more.

5. The aerosol composition according to claim 1, wherein the aerosol composition is a hair cosmetic composition.

6. The aerosol composition according to claim 1, wherein a total content of the component (A) and the component (B) in the aerosol stock solution is from 4.0% by mass to 12% by mass.

7. The aerosol composition according to claim 1, wherein a content of a branched chain higher alcohol in the aerosol stock solution is less than 3% by mass.

8. The aerosol composition according to claim 1, wherein the component (A) comprises N,N-dimethyl-3-octadecyloxypropylamine.

9. The aerosol composition according to claim 1, wherein the component (A) comprises stearic acid dimethylaminopropylamide.

10. The aerosol composition according to claim 1, wherein the aerosol stock solution further comprises lactic acid.

11. The aerosol composition according to claim 1, wherein the aerosol stock solution further comprises water at a content of 70% by mass to 96% by mass in the aerosol stock solution.

12. The aerosol composition according to claim 2, wherein the component (D) comprises lauryl glucoside.

13. The aerosol composition according to claim 2, wherein a content of the component (D) is from 0.003 to 0.5% by mass in the aerosol stock solution.

14. An aerosol composition, comprising:
an aerosol stock solution, comprising:
a cationic surfactant (A);
stearyl alcohol (B);
phenoxyethanol; and
N,N-bis(3-methoxypropyl) isodocosanediamide; and
a propellant (C) comprising carbon dioxide,
wherein the component (A) comprises (A1) N,N-dimethyl-3-octadecyloxypropylamine,
a content of the component (A) is from 1.0% to 3.5% by mass in the aerosol stock solution,
a content of the component (B) is from 2.5% to 10% by mass in the aerosol stock solution,
a molar ratio [(B)/(A1)] of the component (B) with respect to the component (A1) is from 3.0 to 4.0 in the aerosol stock solution,
a content of the component (A1) in the component (A) is from 90% by mass to 100% by mass, and
a difference between a number of carbon atoms of the long-chain alkyl in the component (A1) and the number of carbon atoms of the component (B) is 0.

15. The aerosol composition according to claim 14, wherein the aerosol stock solution further comprises lactic acid.

16. A method of applying the aerosol composition of claim 1, the method comprising:
discharging the aerosol composition in a form of a foam from an aerosol container; and
applying the aerosol composition to an object.

* * * * *